(12) United States Patent
Branson et al.

(10) Patent No.: US 8,140,971 B2
(45) Date of Patent: Mar. 20, 2012

(54) DYNAMIC AND INTELLIGENT HOVER ASSISTANCE

(75) Inventors: Michael J. Branson, Rochester, MN (US); Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 851 days.

(21) Appl. No.: 12/127,290

(22) Filed: May 27, 2008

(65) Prior Publication Data
US 2008/0229197 A1 Sep. 18, 2008

Related U.S. Application Data

(62) Division of application No. 10/723,787, filed on Nov. 26, 2003, now Pat. No. 7,480,863.

(51) Int. Cl.
*G06F 3/048* (2006.01)
*G06F 3/00* (2006.01)

(52) U.S. Cl. ......... 715/711; 715/705; 715/708; 715/715

(58) Field of Classification Search ........... 715/705, 715/708, 711, 715
See application file for complete search history.

(56) References Cited

U.S. PATENT DOCUMENTS

| | | | |
|---|---|---|---|
| 5,546,521 A | 8/1996 | Martinez | |
| 5,604,854 A * | 2/1997 | Glassey | 715/209 |
| 5,754,176 A | 5/1998 | Crawford | |
| 5,995,101 A | 11/1999 | Clark et al. | |
| 6,300,950 B1 | 10/2001 | Clark et al. | |
| 6,483,526 B1 | 11/2002 | Merrick | |
| 6,828,988 B2 * | 12/2004 | Hudson et al. | 715/711 |
| 7,818,672 B2 * | 10/2010 | McCormack et al. | 715/715 |
| 2002/0140746 A1 * | 10/2002 | Gargi | 345/853 |
| 2002/0186257 A1 * | 12/2002 | Cadiz et al. | 345/838 |
| 2004/0095372 A1 | 5/2004 | Berry | |
| 2005/0114778 A1 | 5/2005 | Branson et al. | |

FOREIGN PATENT DOCUMENTS

WO 98/37503 8/1998

* cited by examiner

*Primary Examiner* — Chat Do
*Assistant Examiner* — Stephen Alvesteffer
(74) *Attorney, Agent, or Firm* — Patterson & Sheridan LLP

(57) ABSTRACT

A method, system and article of manufacture for hover help management in data processing systems and, more particularly, for providing dynamic and intelligent hover assistance in graphical user interfaces. One embodiment provides a method of displaying hover assistance on a display screen. The method comprises moving a pointer element to a position over a user interface element shown on the display screen in response to user manipulation of a pointing device, while the pointer element is positioned over the user interface element, invoking a first hover element for display on the display screen, and invoking a second hover element for display on the display screen after invoking the first hover element, and while the pointer element continues to be positioned over the user interface element.

20 Claims, 6 Drawing Sheets

DYNAMIC AND INTELLIGENT HOVER ASSISTANCE

CROSS-REFERENCE TO RELATED APPLICATIONS

This application is a divisional of U.S. patent application Ser. No. 10/723,787, filed Nov. 26, 2003 now U.S. Pat. No. 7,480,863, which is hereby incorporated by reference in its entirety.

BACKGROUND OF THE INVENTION

1. Field of the Invention

The present invention generally relates to data processing systems and, more particularly, to providing hover assistance in user interfaces.

2. Description of the Related Art

The creation of increasingly powerful computer (or computing) systems and a continuously improved information technology (IT) infrastructure are accompanied by a widespread development and use of complex and feature rich software applications. In order to ameliorate the acceptance of such software applications, user-friendly user interfaces, such as graphical user interfaces (GUI), have been developed.

The advent of GUIs resulted in an expectation among end users that software applications include intuitive and aesthetically pleasing graphical interfaces through which end users can effectively interact with the software applications. Thus, GUIs largely contributed to the fact that many users do not read software application manuals before attempting to use a software application. In other words, a user typically relies on the intuitive nature of the application and the corresponding graphical user interface itself.

Intuitiveness of a software application is often improved by hover assistance. Hover assistance consists in displaying help information when a mouse cursor moves (or "hovers") over a particular object of a computer display screen for a predefined amount of time. When the mouse cursor is removed from the particular object of the computer display screen, the help information is removed from display. Hover assistance is pervasive throughout many existing operating systems. Furthermore, in currently developed software applications, most toolbar icons, taskbar buttons and displayed images are associated with hover assistance.

However, hover assistance is frequently not sufficient to effectively satisfy user requests for information concerning objects on the computer display screen. In such cases, the users need to open a separate help window and to perform a search to identify a level of help information that corresponds to their particular requirements. One difficulty with this approach is that the user generally needs to launch the help window and to search through keywords and documentations displayed in the help window to determine the required information. However, the search can be difficult when, for example, terminology used in the help window is not consistent with terminology used in the GUI or the hover assistance. This frequently leads to unproductivity and user frustration.

Therefore, there is a need for an improved technique for providing hover assistance.

SUMMARY OF THE INVENTION

The present invention generally is directed to a method, system and article of manufacture for hover assistance management in data processing systems and, more particularly, for providing dynamic and intelligent hover assistance in graphical user interfaces.

One embodiment provides a method of displaying hover assistance on a display screen. The method comprises moving a pointer element to a position over a user interface element shown on the display screen in response to user manipulation of a pointing device, while the pointer element is positioned over the user interface element, invoking a first hover element for display on the display screen, and invoking a second hover element for display on the display screen after invoking the first hover element, and while the pointer element continues to be positioned over the user interface element.

Another embodiment provides a method of displaying hover assistance for a user on a display screen. The method comprises moving a pointer element to a position over a user interface element shown on the display screen in response to user manipulation of a pointing device, and, while the pointer element is positioned over the user interface element, determining a hover assistance detail level for the user, and invoking a hover element with the determined hover assistance detail level for display on the display screen.

Still another embodiment provides a computer readable medium containing a program which, when executed, performs an operation of displaying hover assistance on a display screen. The operation comprises detecting a pointer element at a position over a user interface element shown on the display screen, while the pointer element is positioned over the user interface element, invoking a first hover element for display on the display screen, and invoking a second hover element for display on the display screen after invoking the first hover element, and while the pointer element continues to be positioned over the user interface element.

Still another embodiment provides a system, comprising a display screen, a graphical user interface displayable on the display screen, an input device for controlling movement of a pointer element over graphical user interface elements of the graphical user interface, and a hover assistance manager. The hover assistance manager is configured for detecting a pointer element at a position over a user interface element shown on the display screen, while the pointer element is positioned over the user interface element, invoking a first hover element for display on the display screen, and invoking a second hover element for display on the display screen after invoking the first hover element, and while the pointer element continues to be positioned over the user interface element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
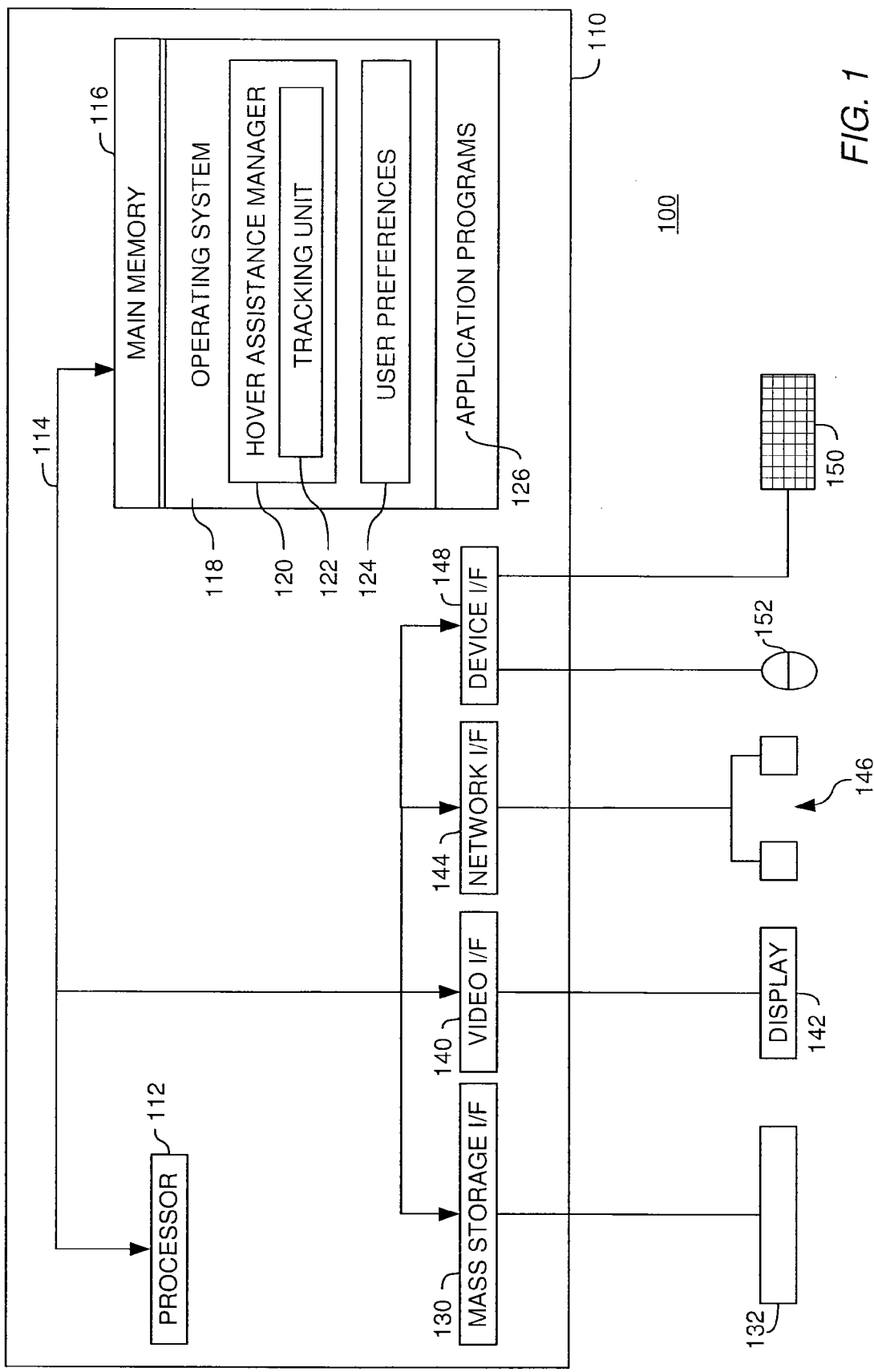
FIG. 1 is a computer system illustratively utilized in accordance with the invention.

The present invention generally is directed to a system, method and article of manufacture for providing dynamic and intelligent hover assistance in a user interface. The user interface includes one or more user interface elements which are shown on a display screen. A user can move a pointer element over the displayed user interface by manipulating a pointing device.

In one embodiment, the pointer element is moved to a position over one of the user interface elements shown on the display screen. While the pointer element is positioned over the user interface element, a first hover element, such as text or graphics, is invoked for display on the display screen. After invoking the first hover element and while the pointer element continues to be positioned over the user interface element, a second hover element is invoked for display on the display screen. In one embodiment, the second hover element provides more detail regarding the user interface element relative to the first hover element. When the pointer element is removed from the position over the user interface element, the first and second hover elements are removed from display.

In one embodiment, if the pointer element remains positioned over the user interface element, subsequently successive hover elements with increasingly more detail regarding the user interface element are displayed. In other words, the user can cause display of hover assistance until a desired level of detail by maintaining the pointer element at the position over the user interface element. Thus, the user may avoid having to open a separate help window and to perform a search to identify a level of help information that corresponds to their particular needs. Accordingly, user frustration and unproductivity for accessing and searching in the help window can be avoided.

In another embodiment, upon detecting the pointer element at the position over the user interface element shown on the display screen, a hover assistance detail level specific to the user is determined. Thus, the determined hover assistance detail level can immediately be invoked for display on the display screen. Accordingly, the hover assistance can be adapted to specific requirements of the user on the basis of user preferences or user behavior patterns indicating the desired hover assistance detail level, thereby allowing the user to access required information concerning user interface elements more rapidly.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, a computing environment 100 is shown. In general, the distributed environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries computer available from International Business Machines of Armonk, N.Y.

Illustratively, the computer system 110 comprises a networked system. However, the computer system 110 may also comprise a standalone device. In any case, it is understood that FIG. 1 is merely one configuration for a computer system. Embodiments of the invention can apply to any comparable configuration, regardless of whether the computer system 110 is a complicated multi-user apparatus, a single-user workstation, or a network appliance that does not have non-volatile storage of its own.

The embodiments of the present invention may also be practiced in distributed computing environments in which tasks are performed by remote processing devices that are linked through a communications network. In a distributed computing environment, program modules may be located in both local and remote memory storage devices. In this regard, the computer system 110 and/or one or more of the networked devices 146 may be thin clients which perform little or no processing.

The computer system 110 could include a number of operators and peripheral systems as shown, for example, by a mass storage interface 130 operably connected to a direct access storage device 132, by a video interface 140 operably connected to a display 142, and by a network interface 144 operably connected to the plurality of networked devices 146. The display 142 may be any video output device for outputting viewable information. In addition to the display 142, the computer system 110 may include other peripheral devices such as speakers and printers.

A user may enter commands and information into the computer system 110 through input devices such as a keyboard 150 and a pointing device 152 (e.g., a computer mouse, a light pen, or even a human finger in the case of a touch screen). These and other devices may be connected to the computer system 110 through a device interface 148. Illustratively, the device interface 148 is a serial port interface, but other interfaces, such as a parallel port or a universal serial bus (USB) are also contemplated.

Computer system 110 is shown comprising at least one processor 112, which obtains instructions and data via a bus 114 from a main memory 116. The processor 112 could be any processor adapted to support the methods of the invention.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 132) or on another computer coupled to the computer system 110 via bus 114.

The memory 116 illustratively includes one or more applications 126. The applications 126 are software products comprising a plurality of instructions that are resident at various times in various memory and storage devices in the computer system 110. When read and executed by one or more processors 112 in the computer system 110, the applications 126 cause the computer system 110 to display user interfaces including one or more user interface elements.

The memory 116 is further shown configured with an operating system 118. The operating system 118 is the software used for managing the operation of the computer system 110. Examples of the operating system 118 include IBM OS/400® UNIX, Microsoft Windows®, and the like. The operating system 118 illustratively includes user preferences 124, which can be received from a user via a suitable input device (e.g., the keyboard 150 or pointing device 152). The operating system 118 further includes a hover assistance manager 120 including a tracking unit 122.

The hover assistance manager 120 provides dynamic and intelligent hover assistance for users of the computer system 110. In one embodiment, the hover assistance manager 120 is configured to display hover assistance on the display 142. The hover assistance is displayed with respect to a user interface element of a user interface displayed on the display 142 when a pointer element hovers over the user interface element. The pointer element may be a cursor under the control of the pointing device 152 or the keyboard 150. Operation of the hover assistance manager 120 is further described with reference to FIGS. 2-9.

Figure 2:
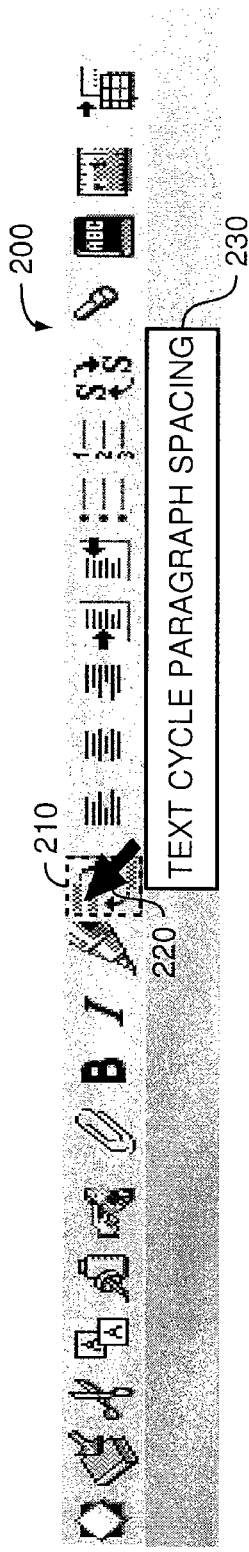
FIGS. 2-5 are partial screen shots illustrating display of hover elements in one embodiment.

Referring now to FIG. 2, an exemplary user interface 200 including a plurality of user interface elements is shown. In one embodiment, the user interfaces are related to corresponding applications (e.g., applications 126 of FIG. 1) or operating systems (e.g., operating system 118 of FIG. 1). The one or more user interface elements can be graphical elements of corresponding user interfaces, such as icons, pushbuttons, pull-down menus, pop-up menus, checkboxes or status indicators included, e.g., in a toolbar or taskbar. It should be noted that particular embodiments described herein may refer to specific user interface elements, such as icons displayed on the display screen. However, references to such specific user interface elements are merely for purposes of illustration and not limiting of the invention.

Illustratively, the user interface 200 includes a plurality of pushbuttons, such as pushbutton 210, which are displayed on a display screen (e.g., display 142 of FIG. 1). By way of example, a mouse cursor 220 (also referred to herein as "mouse pointer") is shown at a position over the pushbutton 210. It is assumed that the mouse cursor 220 hovers over the pushbutton 210 in response to user manipulation of a pointing device, such as a computer mouse (e.g., pointing device 152 of FIG. 1). When the mouse cursor 220 is detected at the position over the pushbutton 210, hover assistance is displayed on the display screen. More specifically, a hover element 230 with a specific hover assistance detail level is invoked and displayed adjacent to the pushbutton 210.

The exemplary user interface 200 is illustrated with different hover elements 310, 410 and 510 in FIGS. 2-5. Illustratively, the different hover elements 310, 410 and 510 are shown with increasing hover assistance detail levels. In other words, each of the hover elements 310, 410 and 510 provides more detail or functionality regarding the pushbutton 210 relative to a previous hover element. In one embodiment, a hover element with an increased hover assistance detail level is displayed in response to occurrence of a predetermined event. Such an event may include, for example, expiration of a predetermined period of time or a user command input via an input device (e.g., input device 150 or 152 of FIG. 1). Displaying hover assistance and selection of suitable hover assistance detail levels is explained in more detail below with reference to FIGS. 6-9.

One embodiment of a method 600 for displaying hover assistance on a display screen (e.g., display 142 of FIG. 1) is explained with reference to FIG. 6. At least several steps of the method 600 can be performed by a hover assistance manager (e.g., hover assistance manager 120 of FIG. 1). Method 600 starts at step 610.

At step 620, a mouse pointer (e.g., mouse pointer 220 of FIG. 2) is detected at a position over a user interface element (e.g., pushbutton 210 of FIG. 2). It is assumed that the mouse pointer hovers over the user interface element. Accordingly, at step 630 a hover text message of a first hover assistance detail level for the user interface element is displayed to a user. Illustratively, in FIG. 2, hover text message 230 "Text Cycle Paragraph Spacing" indicating a short description of an initial hover assistance detail level of a functionality associated with the pushbutton 210 is displayed.

It is noted that particular embodiments described herein may refer to textual or graphical hover elements displayed on the display screen. For example, embodiments may be described with reference to hover text messages. However, references to such hover text messages are merely for purposes of illustration and not limiting of the invention. Thus, it is broadly contemplated that hover elements may include flash, video, audio, extensible markup language (XML) and/or hypertext.

At step 640, a period of time is determined during which the mouse pointer remains at the position over the user interface element. At step 650, the determined period of time is compared to a predetermined threshold. The predetermined threshold can be a preset application-specific default value or a user-specific value. In one embodiment, steps 640 and 650 are performed concurrently. In other words, while the period of time is measured, it is continuously compared to the predetermined threshold. If, at step 650, the determined period of time does not exceed the predetermined threshold, it is determined at step 660 whether the mouse pointer has been removed from the position over the user interface element. If the mouse pointer has not been removed from the position over the user interface element, processing returns to step 640. If, however, the mouse pointer has been removed from the position over the user interface element, the hover text message for the user interface element is removed from display at step 670. The method 600 then exits at step 680.

Figure 3:
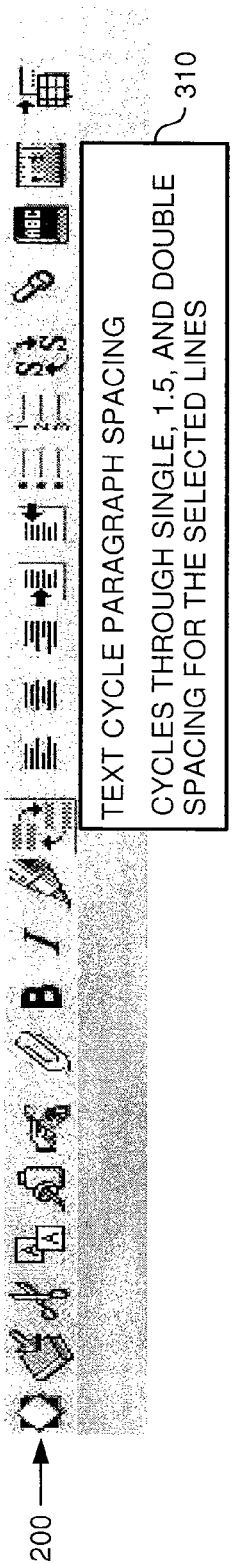

If it is determined, at step 650, that the determined period of time exceeds the predetermined threshold, a hover text message of a next hover assistance detail level for the user interface element is displayed to the user at step 690. In other words, if the determined period of time exceeds the predetermined threshold, it can be assumed that the user requires more detail regarding the user interface element relative to the displayed hover text message of the first hover assistance detail level. Therefore, in one embodiment, the next hover assistance detail level provides more detail regarding the user interface element. For instance, in FIG. 2, if the mouse pointer 220 is maintained at the position over the pushbutton 210, the hover text message 310 of FIG. 3 is displayed in addition to the hover text message 230. In one embodiment, the hover text message of the next hover assistance detail level can be selected on the basis of (or adapted to) a current user context and/or customized for a particular user. In other words, as different users have different levels of skill and/or interest, the hover text message of the next hover assistance detail level can be adapted to the skills/interests of the particular user. For instance, one may assume that frequent computer users are more skilled in the use of software applications than novice users. Thus, the hover text message of the next hover assistance detail level should be selected such that the most useful information is displayed to the particular user. Processing then returns to step 640.

Figure 4:
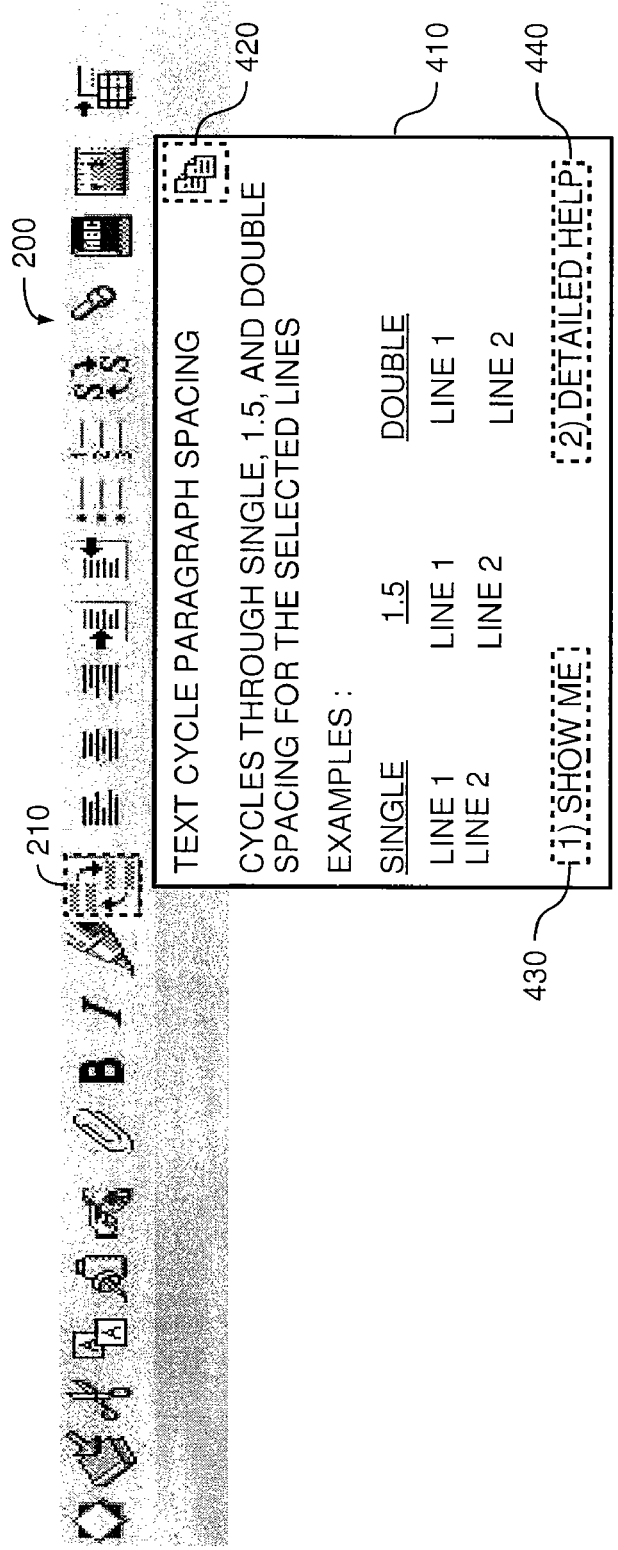
Figure 5:
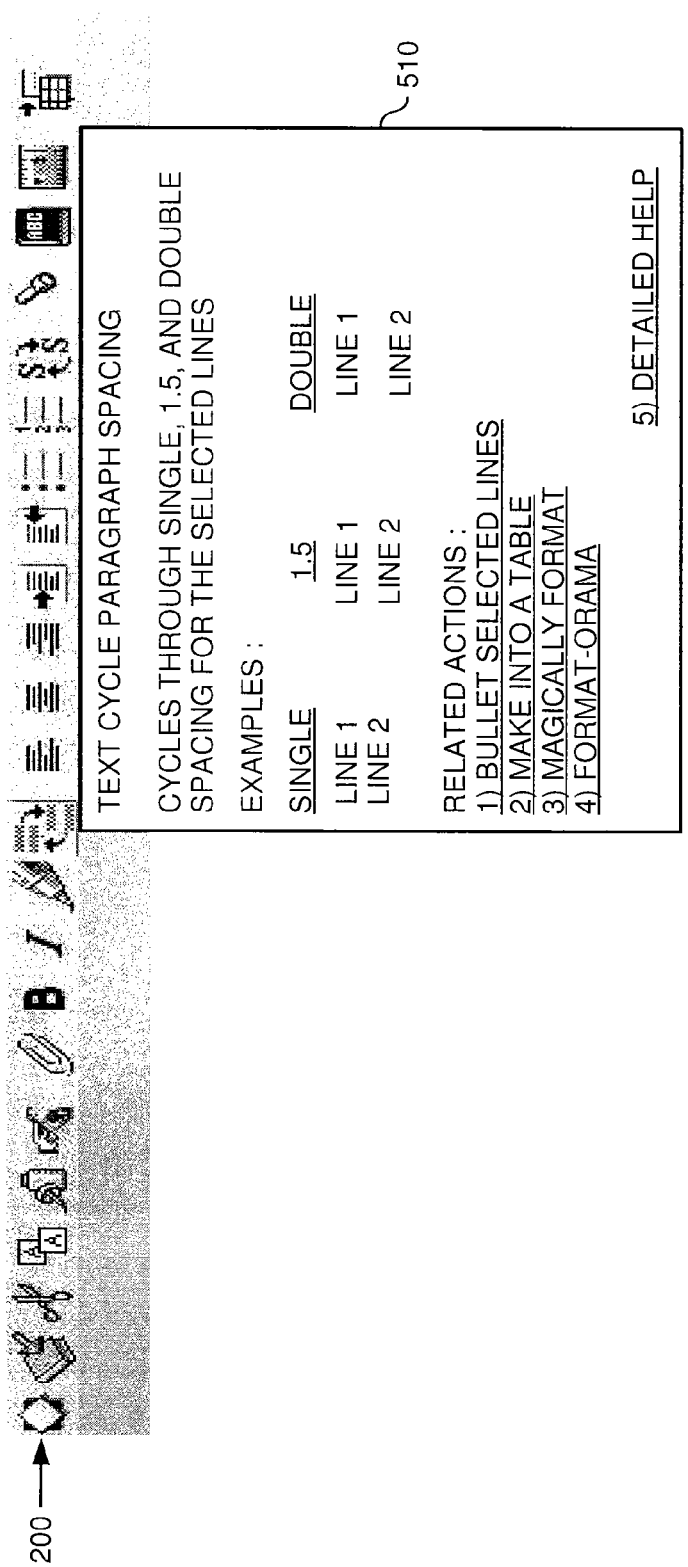

Accordingly, the steps 640, 650 and 690 form a loop which is executed as long as the mouse pointer remains at the position over the user interface element. Thus, the user can cause display of successive hover text messages with increasing hover assistance detail levels by maintaining the pointer element at the position over the user interface element, until a desired or required detail level is reached. Illustratively, in FIGS. 2 and 3, if the user continues maintaining the mouse pointer 220 over the position at the pushbutton 210, the hover text messages 410 of FIG. 4 and 510 of FIG. 5 are successively displayed. If the user has reached a detail level that provides enough detail regarding the user interface element, he or she can remove the mouse pointer from the position over the user interface element. Thus, the hover text message is removed from display.

In one embodiment, successive hover text messages are simultaneously displayed. Furthermore, successive hover text messages can be displayed in a single text box. By way of example, hover text message 310 of FIG. 3 includes hover text message 230 of FIG. 2. In another embodiment, when a hover text message of a next hover assistance detail level is displayed, a hover text message of a previous hover assistance detail level is removed from display. The latter approach may economize on available screen space.

Figure 6:
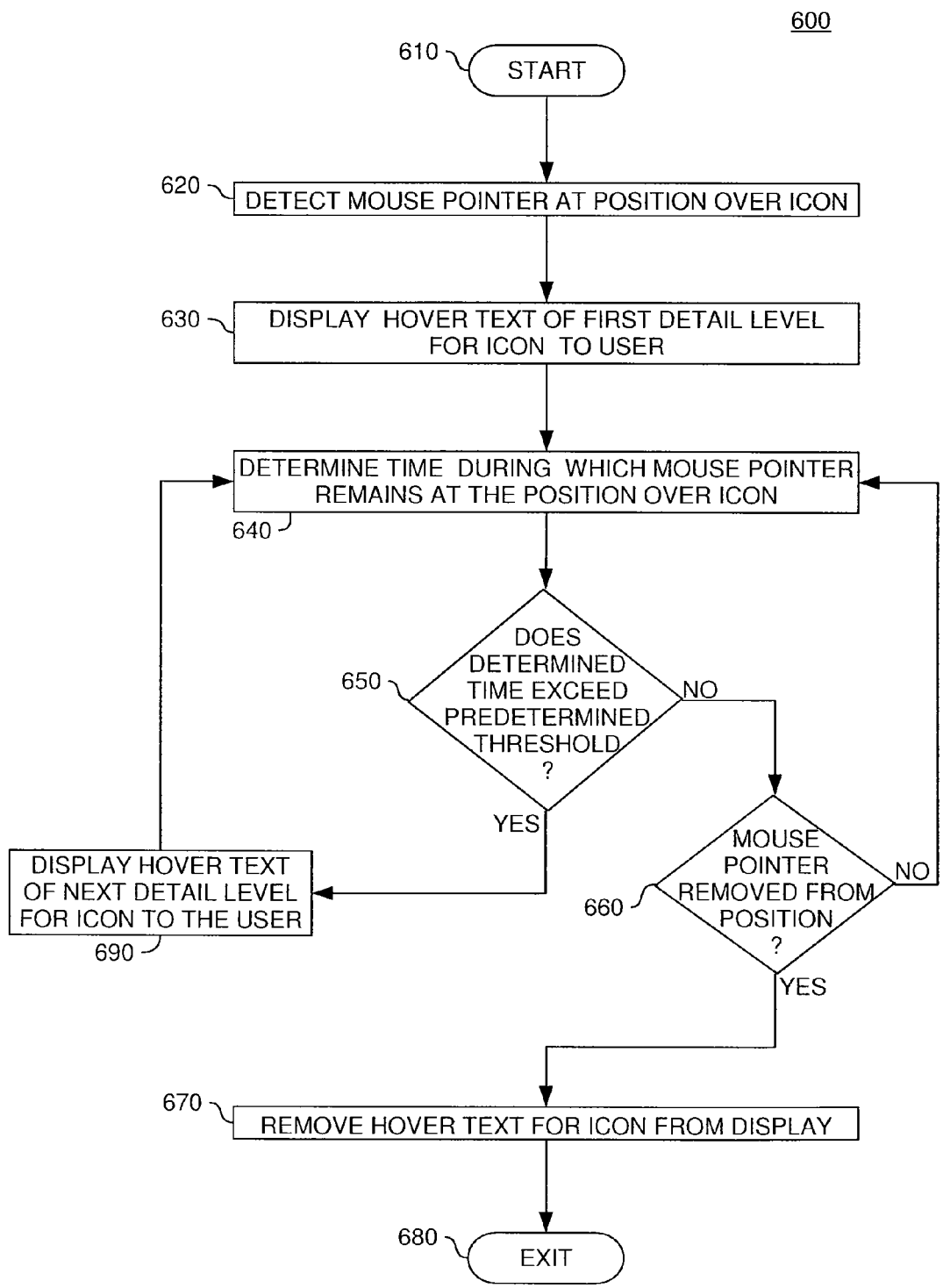
FIG. 6 is a flow chart illustrating a method of displaying hover assistance on a display screen in one embodiment.

It should be noted that FIG. 6 is only one embodiment and that other embodiments are contemplated and will be recognized by persons skilled in the art. For instance, instead of determining and comparing an elapsed period of time with a predetermined threshold in order to determine whether a hover element with a next hover assistance detail level should be displayed, one or more keystrokes on a suitable input device such as a keyboard (e.g., input device 150 of FIG. 1) can be detected and used therefore. By way of example, if a user pushes the right arrow key on the keyboard, a hover element of a next hover assistance detail level is displayed. If the user pushes the left arrow key, a hover element of a previous hover assistance detail level is displayed. Furthermore, the user can cause the hover assistance manager to display the next hover assistance detail level before the elapsed period of time exceeds the predetermined threshold. Accordingly, any suitable technique including user commands for determining whether a hover element of a next or previous hover assistance detail level should be displayed is broadly contemplated.

Figure 7:
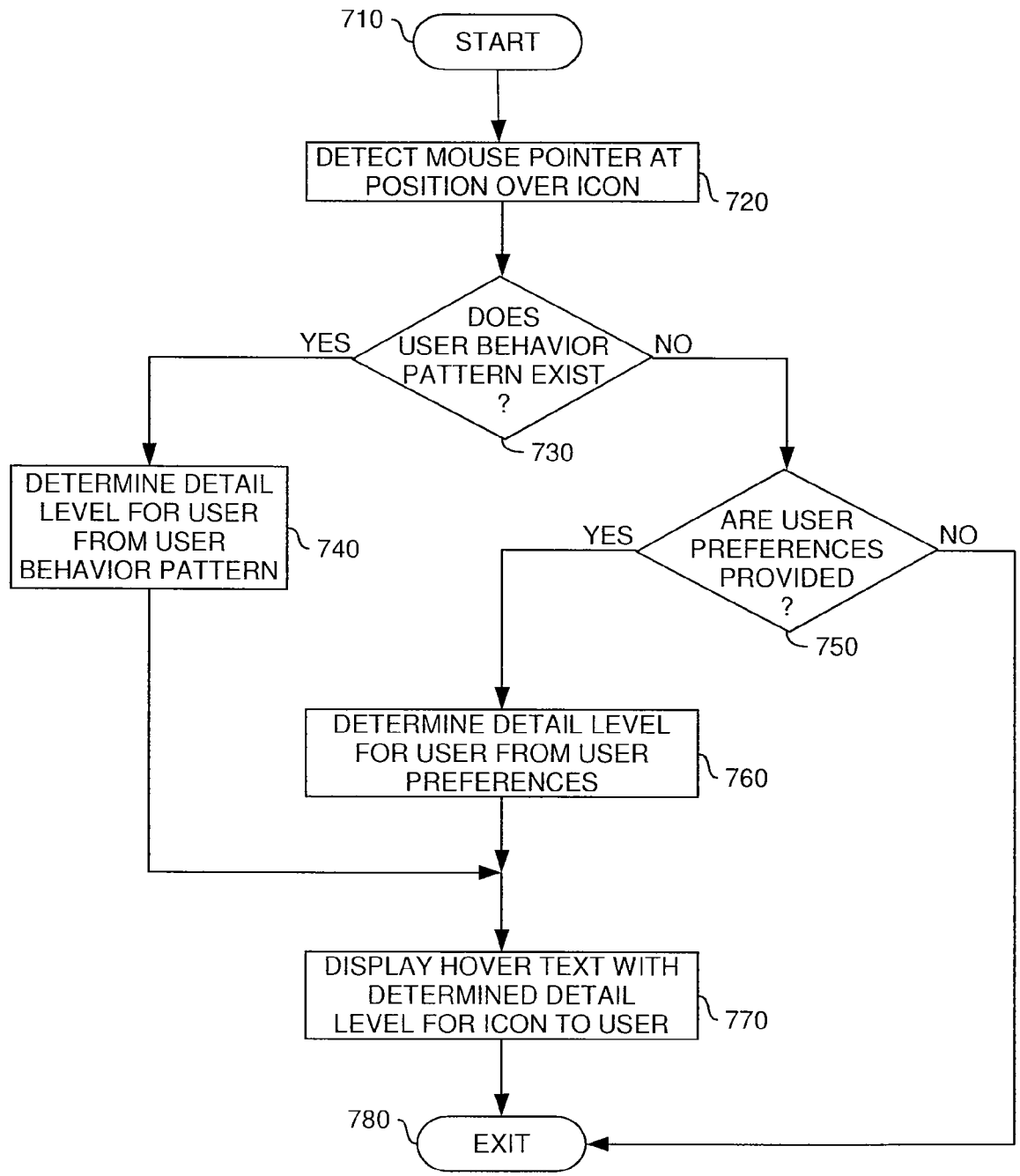
FIG. 7 is a flow chart illustrating a method of determining a hover assistance detail level for a user in one embodiment.

Referring now to FIG. 7, one embodiment of a method 700 for determining a hover assistance detail level for a hover element (e.g., hover element 230 of FIG. 2, 310 of FIG. 3, 410 of FIG. 4 or 510 of FIG. 5) is illustrated. At least several steps of the method 700 can be performed by a hover assistance manager (e.g., hover assistance manager 120 of FIG. 1). Method 700 starts at step 710.

At step 720, a mouse pointer (e.g., mouse pointer 220 of FIG. 2) is detected at a position over a user interface element (e.g., pushbutton 210 of FIG. 2). At step 730, it is determined whether a user behavior pattern exists. The user behavior pattern describes a historical behavior of the user with respect to hover assistance detail levels previously displayed for a given user interface element. In other words, each time the user accesses hover assistance for any user interface element, a highest displayed hover assistance detail level is recorded using a tracking unit (e.g., tracking unit 122 of FIG. 1).

If the user behavior pattern is available, a highest previously recorded detail level for a given user interface element is determined therefrom at step 740. Alternatively, a detail level which is most frequently accessed by the user is determined therefrom. In one embodiment, a detail level for a given user interface element can be predicted based on the historical user behavior pattern of other user interface elements. For example, if the user historically waits for or selects a particular detail level, e.g., the third level, for a plurality of user interface elements, then the particular detail level to be displayed (i.e., the third level) can be predicted.

At step 770, in one embodiment a hover text message of a hover assistance detail level that is equal to the highest detail level is displayed. For instance, assume that the hover text messages 230 of FIG. 2, 310 of FIG. 3, 410 of FIG. 4 and 510 of FIG. 5 have hover assistance detail levels 1-4, respectively. Thus, if the mouse pointer 220 of FIG. 2 hovers over the pushbutton 210 and the user behavior pattern indicates as highest detail level "4", for example, the hover text message 510 of FIG. 5 can immediately be displayed instead of displaying hover text messages 230, 310 and 410 before. However, in one embodiment, all hover text messages of lower hover assistance detail levels can nevertheless be displayed. In this case, for instance, a preset display duration for each displayed hover text message can be applied to shorten a delay for the user to access the hover text message of the most frequently accessed detail level. By way of example, the preset display duration can be user-specific or application-specific. Method 700 then exits at step 780.

If, at step 730, no user behavior pattern is available, it is determined at step 750 whether user preferences (e.g., user preferences 124 of FIG. 1) are available. In one embodiment, the user preferences indicate a preferred hover assistance detail level of the user for a given user interface element. The user preferences can be input by the user via a suitable input device (e.g., input device 150 or 152 of FIG. 1). If no user preferences are available, method 700 exits at step 780. In this case, hover assistance can be displayed according to method 600 of FIG. 6; that is, displaying successive hover assistance levels of increasing detail. If, however, user preferences are available, the preferred hover assistance detail level is determined therefrom at step 760. Processing then continues at step 770 as described above. If both user preferences and a recorded user behavior pattern are available, then it is contemplated that the user may specify which will be used to determine the hover assistance detail level to be displayed.

Users often desire to copy text from one location to another. A common keystroke sequence supported by many applications and operating systems to perform a copy and paste operation is "CTL" and "C" and then "CTL" and "V". By selecting the desired text (e.g., highlighting by clicking and dragging the mouse pointer) and simultaneously pressing the "CTL" and "C" keys and then the "CTL" and "V" keys a user can copy the selected text to a desired location. However, heretofore, users have not been given the ability to copy hover elements. Thus, it is contemplated by the present invention to provide users the capability to copy all of or a portion of the displayed hover assistance elements to a clipboard or another location in memory or storage. To this end, the hover assistance manager 120 of FIG. 1 may be configured to recognize a predefined sequence of user inputs which cause the hover element(s) to be copied.

Figure 8:
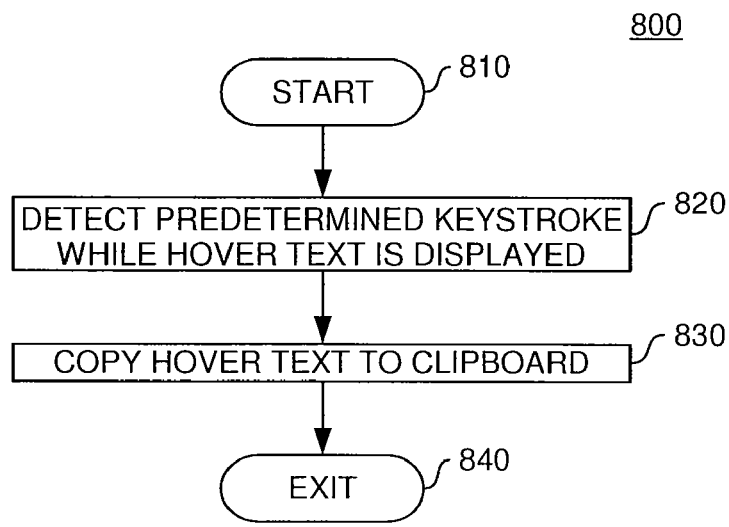
FIG. 8 is a flowchart illustrating a process for copying a hover element in one embodiment.
Figure 9:
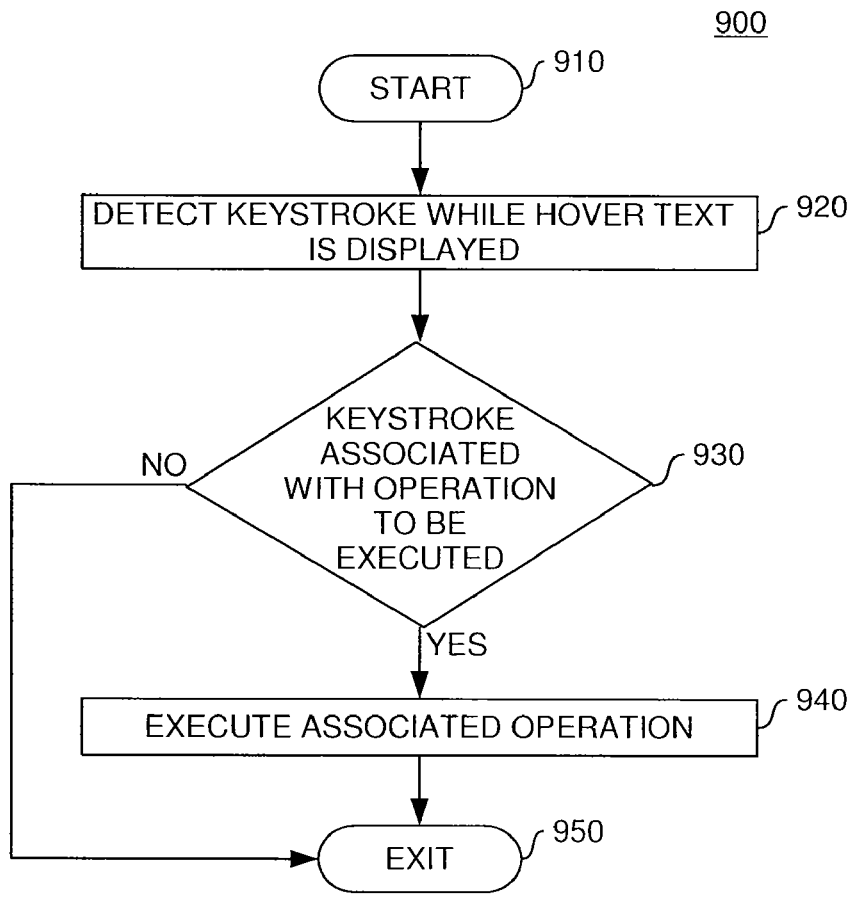
FIG. 9 is a flowchart illustrating a process for initiating execution of an operation using a hover element in one embodiment.

Referring now to FIG. 8, one embodiment of a process 800 for copying a hover element (e.g., hover element 230 of FIG. 2, 310 of FIG. 3, 410 of FIG. 4 or 510 of FIG. 5) is illustrated. Process 800 starts at step 810. At step 820, a predetermined keystroke or a predefined combination of keystrokes on a suitable input device (e.g., input device 150 of FIG. 1) is detected while the hover element is displayed on a display screen (e.g., display 142 of FIG. 1). For instance, while hover text message 310 of FIG. 3 is displayed, the user pushes the keys "CTL" and "C" on a keyboard for copying the hover element. Accordingly, the combination "CTL-C" of keystrokes is determined.

It should be noted that any keystroke or combination of keystrokes is contemplated. Furthermore, any other suitable predetermined user input to cause execution of a copying operation is contemplated. For instance, a user can use a computer mouse (e.g., pointing device 152 of FIG. 1) to cause execution of the copying operation. By way of example, in FIG. 4, the user can use the computer mouse to click on pushbutton 420 for copying the hover element 410. Thus, it is contemplated that the element for invoking copying of hover elements may itself be a hover element, as in the case of pushbutton 420. In one embodiment, the pushbutton 420 may be displayed so long as any other hover elements are displayed. In another embodiment, the pushbutton 420 is invoked only after the user has positioned the pointer element (e.g., mouser pointer) over the element to be copied for a period of time.

At step 830, the hover element is copied to a clipboard or other memory location, which may be user-selectable. Thus, the hover element can be pasted from the clipboard to any location, such as a text document, desired by the user. Process 800 then exits at step 840.

In one embodiment, the displayed hover text message can be provided with an indication of an action to be performed by a user to cause execution of an associated operation. An exemplary process for initiating execution of an operation using a hover element in one embodiment is described below with reference to FIG. 9. At least several steps of the process 900 can be performed by a hover assistance manager (e.g., hover assistance manager 120 of FIG. 1). Process 900 starts at step 910.

At step 920, a keystroke or a combination of keystrokes on a suitable input device (e.g., input device 150 of FIG. 1) is detected while the hover element is displayed on a display screen (e.g., display 142 of FIG. 1). In one embodiment, at least one indication of a predefined key or combination of keys is provided by the hover element together with an indication of an associated operation. For instance, the hover text message 410 of FIG. 4 includes an indication 430 that the key "1" on a keyboard is associated with a "SHOW ME" operation and an indication 440 that the key "2" is associated with a "DETAILED HELP" operation. Thus, the user can push the indicated key or combination of keys to cause execution of the associated operation.

At step 930, it is determined whether the detected keystroke or combination of keystrokes is associated with an operation to be executed. If an associated operation cannot be determined, the process 900 exits at step 950. If, however, an associated operation is determined, the associated operation is executed at step 940. For instance, if the key "1" is pushed while the hover text message 410 of FIG. 4 is displayed, an exemplary operation of pushbutton 210 is illustrated via an animation. If the key "2" is pushed, a help window for detailed help is launched. Processing then exits at step 950.

It should be noted that any keystroke or combination of keystrokes is contemplated. Furthermore, any other suitable action can be associated with an operation to be performed. In this regard, it is noted that the coping operation described above with reference to FIG. 8 illustrates one such action and associated operation.

While the foregoing is directed to embodiments of the present invention, other and further embodiments of the invention may be devised without departing from the basic scope thereof, and the scope thereof is determined by the claims that follow.

What is claimed is:

1. A computer-implemented method of displaying hover assistance on a display screen, comprising:

moving a pointer element to a position over a user interface element shown on the display screen in response to user manipulation of a pointing device;

by operation of one or more computer processors, determining a hover assistance detail level for a first hover element based on: (i) a determined user behavior pattern and (ii) user preferences received from an input device, wherein the first hover element comprises a first plurality of indications of respective actions selectable via user input to cause execution of associated operations;

while the pointer element is positioned over the user interface element, invoking the first hover element with the determined hover assistance detail level, for display on the display screen; and determining whether a condition is met, the condition specifying user selection of at least one indication of the first plurality of indications while the pointer element is positioned over the at least one of the user interface element and the first hover element and prior to the earlier of: (i) expiration of a first predetermined period of time and (ii) user entry of a predetermined input sequence, wherein the at least one indication is selectable by a mouse pointer;

wherein processing branches to execute the associated operation upon determining that the condition is met, wherein a second hover element is invoked for display on the display screen upon determining that the condition is not met, wherein the second hover element comprises a second plurality of indications of respective actions selectable via user input to cause execution of associated operations, and wherein at least one of the first hover element and the second hover element provide assistance regarding the user interface element.

2. The method of claim 1, further comprising removing from display the first hover element upon invoking the second hover element.

3. The method of claim 1, further comprising copying at least one of the first hover element and the second hover element to the clipboard.

4. The method of claim 1, wherein copying the at least one of the first hover element and the second hover element at least in part to the clipboard occurs in response to user input from an input device.

5. The method of claim 1, wherein the associated operation comprises outputting for display a help window including detailed help specific to the user interface element.

6. The method of claim 1, wherein at least one of the first hover element and the second hover element includes a copy element selectable via user input to cause the at least one of the first hover element and the second hover element to be copied at least in part to a clipboard.

7. A computer-implemented method of displaying hover assistance for a user on a display screen, comprising:
    moving a pointer element to a position over a user interface element shown on the display screen in response to user manipulation of a pointing device; and
    by operation of one or more computer processors and while the pointer element is positioned over the user interface element, determining a hover assistance detail level for the user, based on: (i) a determined user behavior pattern and (ii) user preferences received from the user via an input device;
    invoking a first hover element with the determined hover assistance detail level for display on the display screen, wherein the first hover element comprises a first plurality of indications of respective actions selectable via user input to cause execution of associated operations, wherein the at least one indication is selectable by a mouse pointer; and
    determining whether a condition is met, the condition specifying user selection of at least one indication of the first plurality of indications while the pointer element is positioned over the at least one of the user interface element and the first hover element and prior to the earlier of: (i) expiration of a first predetermined period of time and (ii) user entry of a predetermined input sequence;
    wherein processing branches to execute the associated operation upon determining that the condition is met, wherein a second hover element is invoked for display on the display screen upon determining that the condition is not met, wherein the second hover element comprises a second plurality of indications of respective actions selectable via user input to cause execution of associated operations, and wherein at least one of the first hover element and the second hover element provide assistance regarding the user interface element.

8. The method of claim 7, wherein invoking the first hover element comprises:
    successively invoking a plurality of hover elements with increasingly greater hover assistance detail levels for display on the display screen.

9. The method of claim 8, wherein successively invoking the plurality of hover elements comprises:
    for each successive hover element of the plurality of hover elements having an associated hover element detail level:
        determining whether the successive hover element is to be invoked on the basis of user preferences.

10. The method of claim 7, wherein at least one of the first hover element and the second hover element includes a copy element selectable via user input to cause the at least one of the first hover element and the second hover element to be copied at least in part to a clipboard.

11. A computer readable storage medium containing a program which, when executed, performs an operation of displaying hover assistance on a display screen, the operation comprising:
    detecting a pointer element at a position over a user interface element shown on the display screen;
    by operation of one or more computer processors when executing the program, determining a hover assistance detail level for a first hover element based on: (i) a determined user behavior pattern and (ii) user preferences received from an input device, wherein the first hover element comprises a first plurality of indications of respective actions selectable via user input to cause execution of associated operations;
    while the pointer element is positioned over the user interface element, invoking a first hover element with the determined hover assistance detail level for display on the display screen, wherein the at least one indication is selectable by a mouse pointer;
    determining whether a condition is met, the condition specifying user selection of at least one indication of the first plurality of indications while the pointer element is positioned over the at least one of the user interface element and the first hover element and prior to the earlier of: (i) expiration of a first predetermined period of time and (ii) user entry of a predetermined input sequence;
    wherein processing branches to execute the associated operation upon determining that the condition is met; wherein a second hover element is invoked for display on the display screen upon determining that the condition is not met, wherein the second hover element comprises a second plurality of indications of respective actions selectable via user input to cause execution of associated operations;
    wherein at least one of the first hover element and the second hover element provide assistance regarding the user interface element.

12. The computer readable storage medium of claim 11, wherein the operation further comprises:
    removing from display the first hover element upon invoking the second hover element.

13. The computer readable storage medium of claim 11, wherein copying the at least one of the first hover element and the second hover element at least in part to the clipboard occurs in response to receiving user input from an input device.

14. The computer readable storage medium of claim 11, wherein the associated operation comprises outputting for display a help window including detailed help specific to the user interface element.

15. The computer readable storage medium of claim 11, wherein the operation further comprises:
   successively invoking a plurality of hover elements after invoking the second hover element.

16. The computer readable storage medium of claim 15, wherein each successive hover element of the plurality of hover elements provides more detail regarding the user interface element relative to each previous hover element.

17. The computer readable storage medium of claim 15, wherein invoking of each successive hover element occurs after one of (i) expiration of a predefined period of time and (ii) a user input command to display the successive hover element, whichever occurs first.

18. The computer readable storage medium of claim 11, wherein at least one of the first hover element and the second hover element includes a copy element selectable via user input to cause the at least one of the first hover element and the second hover element to be copied at least in part to a clipboard.

19. A system, comprising:
   one or more computer processors;
   a display screen;
   a graphical user interface displayable on the display screen;
   an input device for controlling movement of a pointer element over graphical user interface elements of the graphical user interface; and
   a hover assistance manager configured for:
      detecting a pointer element at a position over a user interface element shown on the display screen;
      by operation of the one or more computer processors, determining a hover assistance detail level for a first hover element based on: (i) a determined user behavior pattern and (ii) user preferences received from the input device, wherein the first hover element is invoked with the determined hover assistance detail level, wherein the first hover element comprises a first plurality of indications of respective actions selectable via user input to cause execution of associated operations;
      while the pointer element is positioned over the user interface element, invoking the first hover element for display on the display screen, wherein the at least one indication is selectable by a mouse pointer; and
      determining whether a condition is met, the condition specifying user selection of at least one indication of the first plurality of indications while the pointer element is positioned over the at least one of the user interface element and the first hover element and prior to the earlier of: (i) expiration of a first predetermined period of time and (ii) user entry of a predetermined input sequence;
      wherein processing branches to execute the associated operation upon determining that the condition is met; wherein a second hover element is invoked for display on the display screen upon determining that the condition is not met, wherein the second hover element comprises a second plurality of indications of respective actions selectable via user input to cause execution of associated operations;
      wherein at least one of the first hover element and the second hover element provide assistance regarding the user interface element.

20. The system of claim 19, wherein at least one of the first hover element and the second hover element includes a copy element selectable via user input to cause the at least one of the first hover element and the second hover element to be copied at least in part to a clipboard.

* * * * *